(12) United States Patent
Oigawa et al.

(10) Patent No.: US 8,292,324 B2
(45) Date of Patent: Oct. 23, 2012

(54) SIDE IMPACT CRASH DETECTION SYSTEM

(75) Inventors: Atsushiko Oigawa, Tokyo (JP); Yasuo Itoga, Tokyo (JP); Hiroo Kawaguchi, Tokyo (JP); Kohtaroh Yoshida, Tokyo (JP); Masaki Kobayashi, Tokyo (JP); Hisayoshi Matsuda, Tokyo (JP)

(73) Assignee: Takata Corporation, Tokyo (JP)

( * ) Notice: Subject to any disclaimer, the term of this patent is extended or adjusted under 35 U.S.C. 154(b) by 460 days.

(21) Appl. No.: 12/461,728

(22) Filed: Aug. 21, 2009

(65) Prior Publication Data
US 2010/0078917 A1  Apr. 1, 2010

(30) Foreign Application Priority Data
Sep. 30, 2008 (JP) ................. 2008-255172

(51) Int. Cl.
*B60R 21/0136* (2006.01)
(52) U.S. Cl. .......................... 280/735; 701/45
(58) Field of Classification Search ............... 280/730.2, 280/735; 701/45, 47
See application file for complete search history.

(56) References Cited

U.S. PATENT DOCUMENTS

| | | | | |
|---|---|---|---|---|
| 3,945,459 A * | 3/1976 | Oishi et al. | ................. | 180/274 |
| 4,684,928 A * | 8/1987 | Takahashi et al. | ........... | 340/521 |
| 4,831,879 A * | 5/1989 | Condne et al. | ................ | 280/735 |
| 5,281,780 A | 1/1994 | Haland | | |
| 5,446,382 A * | 8/1995 | Flora | ............................ | 324/232 |
| 5,491,409 A * | 2/1996 | Flora et al. | .................... | 324/242 |
| 5,619,133 A * | 4/1997 | Shank et al. | ............. | 324/207.24 |
| 5,620,202 A * | 4/1997 | Gray et al. | ..................... | 280/735 |
| 6,470,580 B1 * | 10/2002 | Ushihara et al. | ........... | 33/366.24 |
| 6,591,932 B1 * | 7/2003 | Drummond et al. | .......... | 180/282 |
| 6,984,994 B2 * | 1/2006 | Gregg | ............................ | 324/655 |
| 7,590,481 B2 * | 9/2009 | Lu et al. | .......................... | 701/70 |
| 2008/0030312 A1 | 2/2008 | Aoki | | |

FOREIGN PATENT DOCUMENTS

| JP | 5-66229 | 3/1993 |
|---|---|---|
| JP | 5-66232 | 3/1993 |
| JP | 5-93735 | 4/1993 |
| JP | 7-12840 | 1/1995 |

(Continued)

OTHER PUBLICATIONS

Notification of Reasons for Refusal Japanese Patent Application No. 2008-255172 dated Jul. 13, 2012.

*Primary Examiner* — Joseph Rocca
*Assistant Examiner* — Timothy Wilhelm
(74) *Attorney, Agent, or Firm* — Foley & Lardner LLP

(57) ABSTRACT

A side impact crash sensor that operates in conjunction with displacement of a door outer panel of a vehicle door in the event of a side impact crash. The side impact crash sensor comprises a sensor housing coupled to a vehicle door member in a sectioned region of the door and a pendulum rotates around a rotating shaft secured to the sensor housing in the event of a side impact crash. The pendulum is conductive and is housed in a housing space of the sensor housing. The side impact crash sensor further comprises a detecting section including a conductive coil energized by an alternating current secured to the sensor housing. The detecting section detects a rotation operation mode of the pendulum on the basis of a change in impedance of a conductive coil which occurs in conjunction with a rotation operation of the pendulum.

9 Claims, 7 Drawing Sheets

FOREIGN PATENT DOCUMENTS

| | | |
|---|---|---|
| JP | 7-50122 | 2/1995 |
| JP | 7-198738 | 8/1995 |
| JP | 8-113108 | 5/1996 |
| JP | 10-160459 | 6/1998 |
| JP | 11-287819 | 10/1999 |
| JP | 2000-88875 | 3/2000 |
| JP | 2008-37180 | 2/2008 |

* cited by examiner

SIDE IMPACT CRASH DETECTION SYSTEM

BACKGROUND

The present application relates to a technology for detecting information on a side impact crash of a vehicle.

Hitherto, various types of impact crash sensors have been known for detecting the occurrence of a crash in the event of a vehicle crash. Japanese Unexamined Patent Application Publication No. 8-113108, for example, discloses a side impact crash sensor that detects a side impact crash of a vehicle using a detecting sensor that combines a conductive coil and a permanent magnet. For a conductive coil and permanent magnet sensor to be more effective, there is a need for a technology that can improve the detection accuracy of a sensor as well as achieve a simplified structure without using complicated mechanisms or electronic components.

Accordingly, the various embodiments disclosed herein have been achieved in light of the foregoing and an object thereof is to provide a technology for simplifying the structure of a side impact crash sensor that detects information on a vehicle side impact crash as well as improving the detection accuracy of such a side impact crash sensor.

SUMMARY

One disclosed embodiment relates to a side impact crash sensor that operates in conjunction with displacement of a door outer panel of a vehicle door in the event of a side impact crash, the side impact crash sensor being disposed in a sectioned region sectioned by the door outer panel and a door inner panel of the vehicle door. The side impact crash sensor comprises a sensor housing coupled to a vehicle door member in the sectioned region and a pendulum that is allowed to rotate around a rotating shaft secured to the sensor housing in the event of a side impact crash. The pendulum is conductive and is housed in a housing space of the sensor housing. The side impact crash sensor further comprises a detecting section including a conductive coil energized by an alternating current secured to the sensor housing. The coil is configured to be opposed in the housing space to a plane in which the pendulum rotates. The detecting section detects a rotation operation mode of the pendulum on the basis of a change in impedance of a conductive coil which occurs in conjunction with a rotation operation of the pendulum.

Another disclosed embodiment relates to side impact crash detection system for detecting information on a side impact crash of a vehicle. The side impact crash detection system comprises a side impact crash sensor and a determination section for determining a side impact crash mode of the vehicle door. The side impact crash sensor comprises a sensor housing coupled to a vehicle door member in the sectioned region and a pendulum that is allowed to rotate around a rotating shaft secured to the sensor housing in the event of a side impact crash. The determination section determines the side impact crash mode of the vehicle door on the basis of the rotation operation mode of the pendulum detected by the detecting section of the side impact crash sensor.

Another disclosed embodiment relates to a vehicle comprising an engine operation system; an electrical system; a drive control unit that performs drive control of the engine operation system and the electrical system; and a vehicle door whose door panel displaces in the event of a side impact crash of the vehicle, the vehicle door being provided for loading and unloading a vehicle occupant. The vehicle further comprises a sensor apparatus that detects a side impact crash mode of the vehicle door; and a control signal output unit that outputs a control signal to an apparatus subjected to control on the basis of information detected by the sensor apparatus. The sensor apparatus comprises a side impact crash sensor and a determination section for determining a side impact crash mode of the vehicle door It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
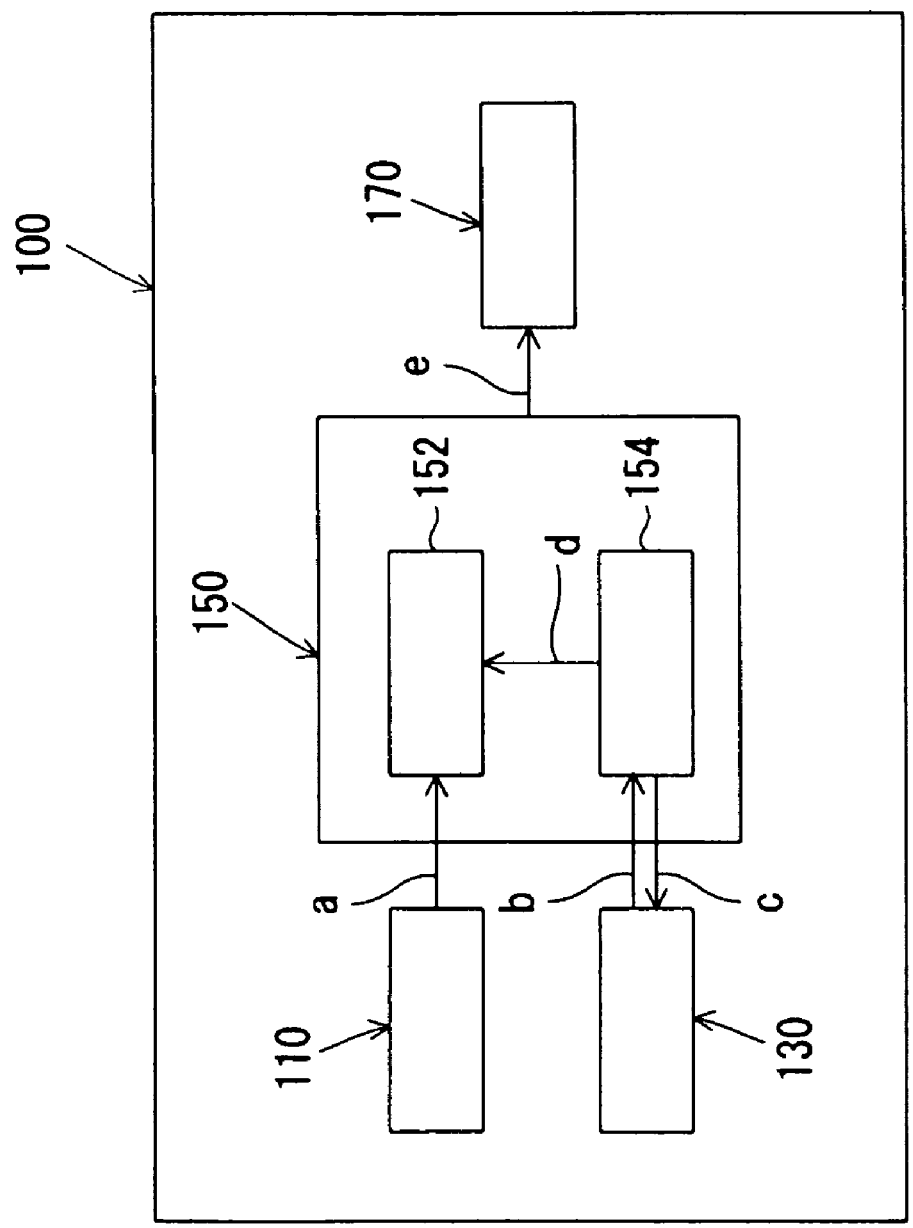
FIG. 1 is a schematic diagram of an occupant restraint system according to an embodiment.

A vehicle may include at least an engine operation system, an electrical system, and a drive control apparatus, a vehicle door, a sensor apparatus, and a control signal output unit. The engine operation system is structured as a system that affects engine and vehicle operation. The electrical system is structured as a system that affects the electrical components used in a vehicle. The drive control apparatus is structured as an apparatus that has a function for performing drive control of the engine operation system and the electrical system. The vehicle door is structured as a door for loading or unloading an occupant whose outer panel displaces in the event of a side impact crash of a vehicle.

The sensor apparatus is structured as a device that performs a function for detecting a side impact on the vehicle door. The sensor apparatus comprises a side impact crash detection system. The control signal output unit is structured as a unit that has a function of outputting a control signal to an apparatus subjected to control on the basis of the information derived by the sensor apparatus. An apparatus subjected to control may include an occupant restraint apparatus such as a seatbelt apparatus and an airbag module that are triggered to restrain a vehicle occupant in the event of an impact crash into a side of a vehicle and an alarm apparatus that provides a visual output and an audio output to inform an occupant of the occurrence of an impact crash into a side of a vehicle. The control signal output unit may be structured as a unit dedicated to controlling an apparatus subjected to control, or the drive control apparatus for performing drive control of the engine operation system and the electrical system may also be used as the control signal output unit. This arrangement provides a vehicle that uses the proper information determined by the determination section of the side impact crash system for various apparatuses subjected to control affecting a vehicle.

The side impact crash detection system may be a system that detects information on a side impact crash of a vehicle. The side impact crash detection system comprises at least a side impact crash sensor and a determination section for determining the side impact crash mode of a vehicle door. The determination section particularly determines the side impact crash mode of a vehicle door on the basis of the rotation operation mode of the pendulum detected by the detecting section of the detecting sensor. The determination section determines whether an appropriate side impact crash is likely to need an immediate restraint of an occupant or whether it is so slight that it is unlikely to need or does not need an immediate restraint of the occupant. The determination section further determines whether an appropriate side impact crash is a crash into an on-the-street or roadside object or a crash into those other than such an on-the-street or roadside object. The information on the side impact crash mode detected by such determination section is appropriately used to control an occupant restraint apparatus. Such a control may comprise triggering a seatbelt apparatus and an airbag module to restrain a vehicle occupant in the event of an impact crash into a side of a vehicle; controlling an alarm apparatus that provides a visual output and an audio output to inform an occupant of the occurrence of an impact crash into a side of a vehicle; or controlling other apparatuses to be subjected to control. The side impact crash detection system having the structure described below allows the determination section to properly determine the side impact crash mode of a vehicle door using the detection information obtained by a side impact crash sensor having a high detection accuracy.

As described below, a side impact crash sensor detects information on a side impact crash of a vehicle using a conductive coil. The side impact crash sensor includes a sensor housing mounted to a vehicle door member, a conductive pendulum that is housed in a housing space of the sensor housing and is allowed to rotate around a rotating shaft secured to the sensor housing in the event of a side impact crash of a vehicle, and a detecting section. The detecting section includes a conductive coil energized by an alternating current secured to the sensor housing so as to be opposed in the housing space to a plane in which the pendulum rotates. The detection system detects a rotation of the pendulum, thereby simplifying the structure as well as improving the detection accuracy.

The occupant restraint system may include at least the side impact crash detection system, the occupant restraint apparatus, and the control unit. The occupant restraint apparatus is structured as an apparatus that restrains an occupant in a vehicle in the event of a side impact crash of the vehicle. The occupant restraint apparatus may include an airbag apparatus (e.g., an airbag module) that is intended to restrain an occupant by inflating and deploying an airbag in an occupant restraint region and an occupant restraint device such as a seatbelt apparatus that restrains the thorax and abdomen of an occupant seated in a vehicle seat through a seatbelt. When an airbag apparatus is used as an occupant restraint apparatus, an airbag apparatus whose airbag is housed in a seat, a pillar, an upper roof rail, or the like can be used.

The control unit is structured as a unit that has at least a function for performing drive control of the occupant restraint apparatus on the basis of the information determined by the determination section of the side impact crash detection system, namely, a crash mode associated with a side impact cash of the vehicle. Typically, when the determination section determines that an appropriate side crash is likely to need an immediate restraint of a vehicle occupant, a drive control signal may be outputted to the airbag apparatus and the seatbelt apparatus. The control unit may be structured as a unit dedicated to controlling the occupant restraint apparatus, or a means for performing drive control of the engine operation system and the electrical system may also be used as the control unit. The occupant restraint system having the structure described above allows the occupant restraint apparatus to be controlled using proper information determined by the determination section of the side impact crash detection system, thereby ensuring that a vehicle occupant is restrained.

The occupant restraint system may be provided with an acceleration sensor for detecting information on the acceleration acting on a vehicle. The control unit preferably performs drive control of the occupant restraint apparatus on the basis of both the information determined by the determination section of the side impact crash detection system and the information detected by the acceleration sensor. Typically, if the amount of movement and the movement speed of the pendulum are relatively high, and the acceleration acting on the vehicle exceeds a prescribed level, it may be determined that an appropriate side impact crash is likely to need an immediate restraint of a vehicle occupant and drive control of the occupant restraint apparatus is performed. The occupant restraint system having the structure described above can perform drive control of the occupant restraint apparatus more properly on the basis of both the information determined by the determination section of the side impact crash detection system and the information detected by the acceleration sensor.

The side impact crash sensor has a simplified structure as well as an improves detection accuracy. Such a side impact crash sensor is typically provided on an automobile or another vehicles to detect information on a side impact crash. The vehicle mentioned herein includes an automobile, aircraft, a vessel, an electric train, a bus, a truck, and the like.

The side impact crash sensor may be disposed in a sectioned region that is sectioned by a door outer panel and a door inner panel of a vehicle door. The side impact crash sensor operates in conjunction with displacement of the door outer panel associated with a side impact crash of a vehicle. The side impact crash sensor comprises at least a sensor housing, a pendulum, and a detecting section.

The sensor housing is coupled to a vehicle door member in the sectioned region sectioned by the door outer panel and the door inner panel of the vehicle door. A vehicle door component may include various types of members facing the sectioned region sectioned by the door outer panel and the door inner panel, such as a member (e.g., a door beam or a reinforcement member) that is installed in the shape of a bar between a door front end and a door rear end of the vehicle door and deflects inward in conjunction with displacement of the door outer panel associated with a side impact crash of the vehicle, a door frame, a door inner panel, and the like.

The pendulum is housed in the housing space of the sensor housing. The pendulum is a conductive component that is allowed to rotate around a shaft secured to the sensor housing in the event of a side impact crash. The plane of rotation for the pendulum is perpendicular to the axis of rotation (e.g., the transverse axis of the rotation shaft). According to one exemplary embodiment, the plane of rotation extends in the transverse direction of the vehicle door, with the pendulum rotating around a shaft extending in the longitudinal direction of the vehicle. According to another exemplary embodiment, the plane of rotation extends in the transverse direction of the vehicle door, with the pendulum rotating around a shaft perpendicular to the longitudinal direction of the vehicle. The pendulum is formed from a conductive or magnetic materials such as steel, aluminum, ferrite or the like.

The detecting section is secured to the sensor housing in such a manner that a conductive coil energized by an alternating current is opposed to the plane of rotation of the pendulum in the housing space. The detecting section detects the rotation of the pendulum by sensing a change in impedance of the conductive coil which occurs in conjunction with the rotation of the pendulum. Rotation operation mode of the pendulum may include the angle of rotation, angular speed, angular acceleration, and the amount of rotation.

In the detecting sensor, the pendulum rotates through a predetermined trajectory in the rotation plane (a two-dimensional plane) and the detecting section detects the rotation of the pendulum while the distance between the rotating shaft and the detecting section remains generally the same, regardless of the side impact crash mode of the vehicle door.

With this arrangement, the side impact crash sensor 130 is a simplified structure, mainly consisting of the pendulum and the detecting section. This eliminates the need for using an excessive number of complicated mechanisms and electronic components.

According to an exemplary embodiment, the side impact crash sensor is a non-contact type sensor using a conductive coil. A non-contact type sensor is not easily affected by the ambient environment due to its high resistance to impact and unresponsiveness to an impact. The structure allows the detecting section to more effectively and accurately detect the rotation of the pendulum as it rotates through a predetermined trajectory in the rotation plane. Preferably, the sensor housing of the detecting section is made of metal or, for example, a non-magnetic iron which is not easily affected by a magnetic field. With this arrangement, the detecting section is not easily affected by a magnetic field present outside of the sensor housing or in particular a magnetic field emitted from other in-vehicle components or a magnetic field present in the outside environment, providing the effects and advantages of being resistant to magnetic noise.

In a side impact crash sensor according to a further embodiment, it is preferable that the pendulum is provided with a spring that provides an elastic urging force to the pendulum so that the pendulum rotates when acceleration exceeding a specified acceleration level acts on the sensor housing. With this arrangement, the side impact crash sensor can be prevented from being triggered at the time of a slight side impact crash which leads to almost no displacement or deformation of the door outer panel of the vehicle door.

Preferably, a side impact crash sensor according to a further embodiment includes a modularized single sensor module having the pendulum and the detecting section integrally mounted to the sensor housing. The sensor module is then mountable to a vehicle door member with a mounting bracket. By including the pendulum and the detecting section assembled in an integral manner, the side impact crash sensor can be used in vehicle doors of different vehicle models.

An occupant restraint system 100 will be described with reference to FIGS. 1 to 7 according to one exemplary embodiment. In this embodiment the occupant restraint apparatus comprises an airbag module having an airbag that is inflatable and deployable in an occupant restraint area at an occupant's side in the event of a crash.

Referring to FIG. 1, a schematic diagram of the occupant restraint system 100 is shown. In various embodiments, the occupant restraint system 100 can be applied as a system that restrains an occupant seated in a driver's seat, a passenger seat, or a rear passenger seat. Although not illustrated, a vehicle to which the occupant restraint system 100 is mounted is provided with an engine operation system related to a number of vehicle components constituting the vehicle and an engine and vehicle operation, an electrical system related to electrical components used in the vehicle, and a drive control apparatus that performs drive control of the engine operation system and the electrical system, in addition to the occupant restraint system 100.

The occupant restraint system 100 is a system that is typically mounted to an automobile (vehicle) and is includes an acceleration sensor 110, a side impact crash sensor 130, an ECU (electronic control unit) 150, and an airbag module 170. The ECU 150 comprises at least a CPU (central processing unit) 152 and an integrated circuit such as an ASIC (application-specific integrated circuit) 154.

The ECU 150 mentioned herein is a control unit for performing drive control of the airbag module 170. Also, the ECU 150 may be structured as part of a control unit as a drive control unit for performing control of the vehicle engine operation system and the electrical system. A system consisting of the ECU 150 and the side impact crash sensor 130 is a side impact crash detection system (e.g., sensor apparatus) for detecting information on a vehicle side impact crash.

The acceleration sensor 110 detects information on triaxial (X-axis, Y-axis, and Z-axis) acceleration acting on the vehicle. Acceleration information that is detected by the acceleration sensor 110 is outputted to the CPU 152. Preferably, the acceleration sensor 110 is typically mounted to each of the right-hand and left-hand B pillars of the vehicle.

The side impact crash sensor 130, to be described in greater detail below, is structured as a detecting sensor that operates in conjunction with displacement (i.e., deformation or movement) of the door outer panel associated with a side impact crash and detects a predetermined rotation of a detected object or target. Detected object information b detected by the side impact crash sensor 130 is sent to the ASIC 154. Preferably, the side impact crash sensor 130 is typically mounted to each of the door beams or the reinforcement members installed on the right-hand and left-hand vehicle doors.

The ECU 150 is structured as a control mechanism for performing drive control of at least an airbag module 170, including at least the CPU 152 and the ASIC 154. The ASIC 154 is structured as an IC (integrated circuit) chip used to control the side impact crash sensor 130 or process a signal. Specifically, the ASIC 154 performs a first function of outputting a drive signal c to the side impact crash sensor 130, a second function of outputting rotating operation information d of the detected object to the CPU 152 on the basis of the detected object information b detected by the side impact crash sensor 130, and a third function of performing failure diagnosis of the side impact crash sensor 130. According to one exemplary embodiment, ECU 150 may lack ASIC 154 and all of the functions of the ASIC 154 may be performed by the CPU 152. On the basis of the acceleration information a outputted from the acceleration sensor 110 and the rotating operation information d outputted from the ASIC 154, the CPU 152 determines the side impact crash mode of the vehicle door and outputs a drive control signal e to an airbag module 170. Accordingly, on the basis of the rotation operation mode of the detected object (pendulum 131 to be described below) detected by at least the side impact crash sensor 130 (detecting section 133 to be described below), the CPU 152 determines the side impact crash mode of the vehicle door.

Although not illustrated, the airbag module 170 is provided with at least an airbag and a gas supply unit. The airbag consists of a bag made of cloth and is structured as an inflatable and deflatable component. When a drive control signal e outputted from the ECU 150 triggers the gas supply unit, gas from the gas supply unit inflates and deploys the airbag in the occupant restraint area. This allows a vehicle occupant to be restrained via the airbag of the airbag module 170 in the event of a crash. The airbag module 170 mentioned herein is structured as a unit for restraining an occupant in the event of a side impact crash of a vehicle.

In the occupant restraint system 100, as the occupant restraint apparatus driven and controlled by the drive control signal e from the ECU 150, a different occupant restraint apparatus from the airbag module 170 can be used in place of or in addition to the airbag module 170. An occupant restraint apparatus such as a seatbelt apparatus or an alarm apparatus that provides a visual output and an audio output to inform an occupant of the occurrence of a side impact crash can be typically used as the different occupant restraint apparatus from the airbag module 170.

Figure 2:
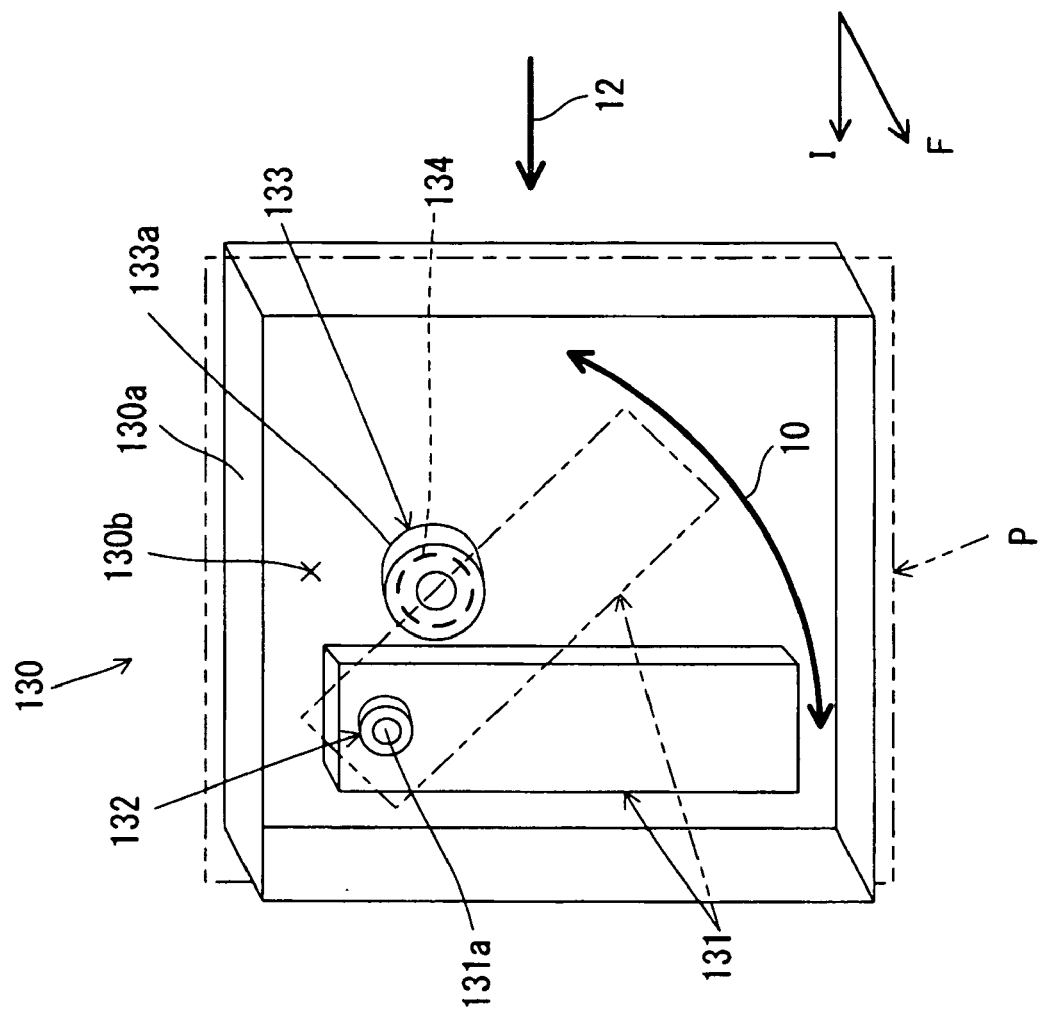
FIG. 2 is a schematic view showing the structure of a side impact crash sensor according to an embodiment.
Figure 3:
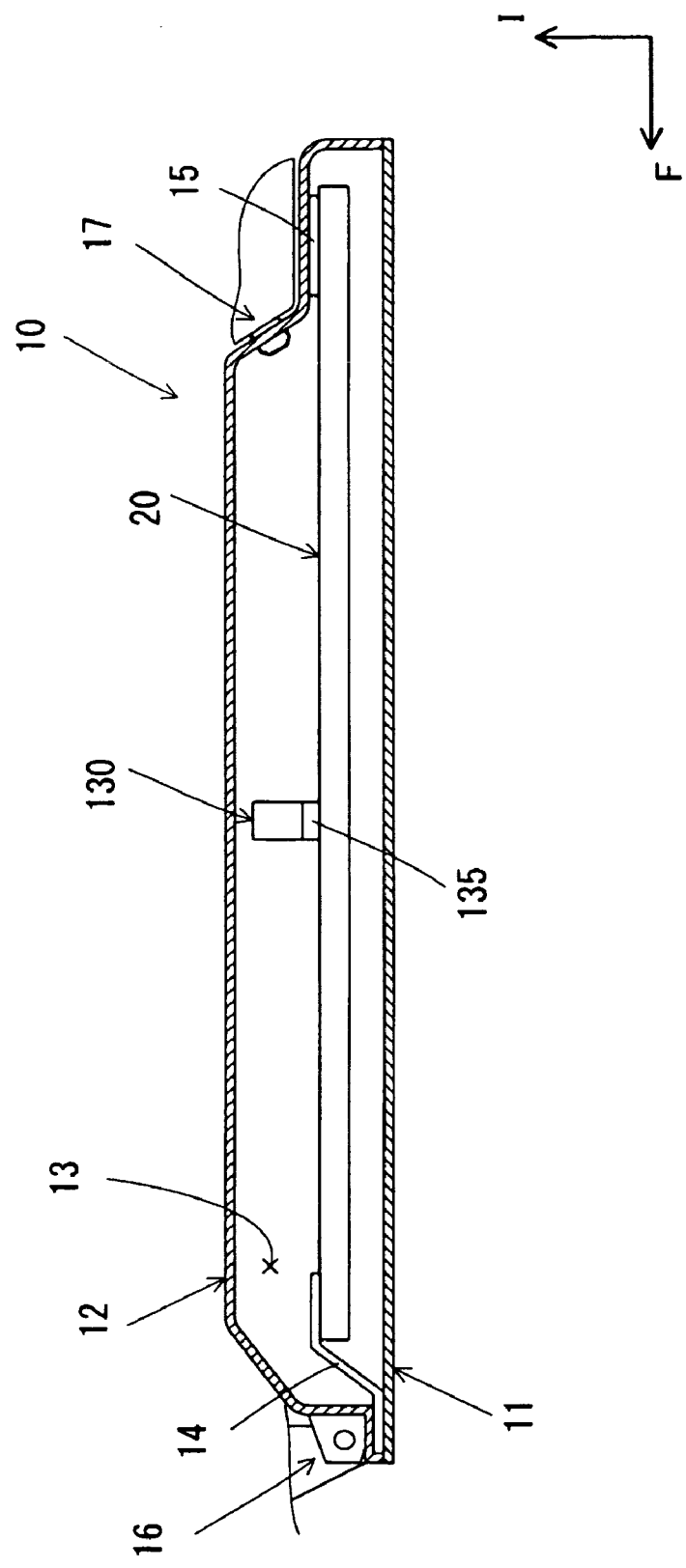
FIG. 3 is a cross-sectional view of a vehicle door equipped with a side impact crash sensor as shown in FIG. 2.

Referring now to FIGS. 2 and 3, schematic views of the structure of the side impact crash sensor 130 and its vicinity are shown according to an exemplary embodiment. FIG. 2 is a schematic view showing the structure of the side impact crash sensor 130 according to this embodiment. FIG. 3 is a cross-sectional view of a vehicle door 10 equipped with the side impact crash sensor 130 as shown in FIG. 2. In FIGS. 2 and 3, an arrow F indicates the vehicle front (forward direction), while an arrow I indicates the interior direction of the vehicle (direction of passenger compartment).

As shown in FIG. 2, the side impact crash sensor 130 according to this embodiment comprises at least a sensor housing 130a, a pendulum 131, and a detecting section 133 (e.g., a coil sensor).

The sensor housing 130a is structured as a metal shield case, which defines a housing space 130b for housing the pendulum 131 and the detecting section 133. Preferably, the sensor housing 130a for housing at least the detecting section 133 is made of a material which is not easily affected by a magnetic field. According to one exemplary embodiment, the sensor housing 130a is formed of metal, for example, non-magnetic iron. With this arrangement, the detecting section 133 housed inside the housing space 130b of the sensor housing 130a is not easily affected by a magnetic field present outside of the sensor housing 130a, or in particular a magnetic field emitted from other in-vehicle components or a magnetic field present in the outside environment. Such a sensor housing 130a provides magnetic noise resistance for the side impact crash sensor 130.

The pendulum 131 is structured as a long, flat-plate mass member (mass) that is allowed to rotate in the direction indicated by an arrow 10. The pendulum 131 rotates in a two-dimensional rotation plane (rotation plane P in FIG. 2) around a rotating shaft 131a that is secured to the sensor housing 130a. The pendulum 131 is typically made of conductive or magnetic materials containing steel, aluminum, ferrite or the like.

The rotating shaft 131a of the pendulum 131 has a coiled spring 132 provided as an elastic element. The spring 132 impedes the pendulum 131 from rotating in the direction 10 in a low acceleration state in which the acceleration (for example, acceleration inputted in the direction indicated by an arrow 12 in FIG. 2) acting on the side impact crash sensor 130 at the time of the occurrence of a side impact crash of the vehicle door is relatively low. However, the spring 132 has an elastic urging force that is weak enough such that it allows the pendulum 131 to rotate in the direction 10 in a high acceleration state in which acceleration exceeding that in the low acceleration state acts on the side impact crash sensor 130. In other words, the spring 132 is a spring that exerts an elastic urging force to the pendulum 131 so as to allow the pendulum 131 to rotate when acceleration exceeding a predetermined acceleration level acts on the sensor housing 130a. The spring 132 can prevent the side impact crash sensor 130 from being triggered at the time of a slight side impact crash which leads to almost no displacement or deformation of the door outer panel 11 of the vehicle door 10.

If an impact applies a rotating force to the pendulum 131 that overcoming the elastic urging force generated by the spring 132, the pendulum 131 rotates. The pendulum 131 starts at an initial position indicated by solid lines in FIG. 2 and goes through, for example, a position indicated by dashed-two dotted lines in FIG. 2, passing through the front of the detecting section 133, thereby acting as a detected object (e.g., target) of the detecting section 133.

According to one embodiment shown in FIG. 2, the pendulum 131 rotates around the rotating shaft 131a extending in the longitudinal direction of the vehicle in a plane extending in the transverse direction of the vehicle door (e.g., a generally vertical plane). According to another exemplary embodiment, the pendulum 131 may be oriented such that it rotates around a rotating shaft extending in the direction intersecting with the longitudinal direction of the vehicle in a plane extending in the transverse direction of the vehicle door (e.g., a generally horizontal plane).

The detecting section 133 houses a conductive coil 134 having one or more turns of wire in a circular shape in the coil housing 133a. In this case, the detecting section 133 is disposed in the housing space 130b of the sensor housing 130a in such a manner that the conductive coil 134 is opposed to the two-dimensional rotation plane (rotation plane P in FIG. 2) of the pendulum 131. This arrangement allows a plane in which the pendulum 131 exists to be substantially parallel to a plane in which the conductive coil 134 exists. The conductive coil 134 is connected to an alternating-current power supply (not illustrated) through wiring including a connector. When the alternating-current power supply is activated, the conductive coil 134 receives an alternating current (sinusoidal current) supply, generating an alternating magnetic field. When such an alternating magnetic field passes through a conductive component (i.e., a conductive body or a magnetic body), such a conductive component generates an eddy current, causing a change in impedance of the conductive coil 134 in conjunction with the rotation of the pendulum 131.

Accordingly, when the conductive coil 134 is energized by an alternating current and its vicinity is shielded by the pendulum 131 as the conductive component, a change in the degree of the shielding causes a change in impedance of the conductive coil 134. The rotation of the pendulum 131 (e.g., the rotational angle, angular velocity, etc.) cause a change in impedance of the conductive coil 134, thereby allowing the detection of the traveling speed of a crashed portion.

As shown in FIG. 3, the vehicle door 10 is coupled with a vehicle body 17 with a door hinge 16 therebetween, including a door outer panel 11 that forms an outer wall of the vehicle and a door inner panel 12 that forms an inner wall of the vehicle. The vehicle door 10 may be structured as a front door that is installed between an A pillar and a B pillar of the vehicle or a rear door that is installed between the B pillar and a C pillar of the vehicle. A door beam 20 extending straight in the longitudinal direction of the vehicle is installed in a sectioned region 13 sectioned by the door outer panel 11 and the door inner panel 12. A single sensor module consisting of the sensor housing 130a, along with the pendulum 131 and the detecting section 133 integrally mounted inside the sensor housing 130a, is installed as a unit to the door beam 20 with the mounting bracket 135. The side impact crash sensor 130 according to this embodiment is mounted to the door beam 20 with a mounting bracket 135 such that the plane of rotation of the pendulum 131 is perpendicular to an axis of the door beam 20.

The door beam 20 is a cylindrical, bar-like, or pillar-like member extending in the longitudinal direction of the vehicle. The door beam is mounted at one end thereof to the vehicle body 17 with a front bracket 14, and is mounted at the other end thereof to the vehicle body 17 with a rear bracket 15. In other words, the door beam 20 having its both ends corresponding to the brackets 14, 15 as fixing ends is installed in the shape of a long bar between a door front end (front bracket 14) and a door rear end (rear bracket 15) in relation to the longitudinal direction of the vehicle. With this arrangement, the door beam 20 deforms inward of the vehicle, namely, deforms in a crescent shape in conjunction with the displacement of the door outer panel 11 in the event of a side impact crash of the vehicle. One or more of the door beams 20 are installed close to the door outer panel 11 at the upper and lower portions of the door.

Figure 4:
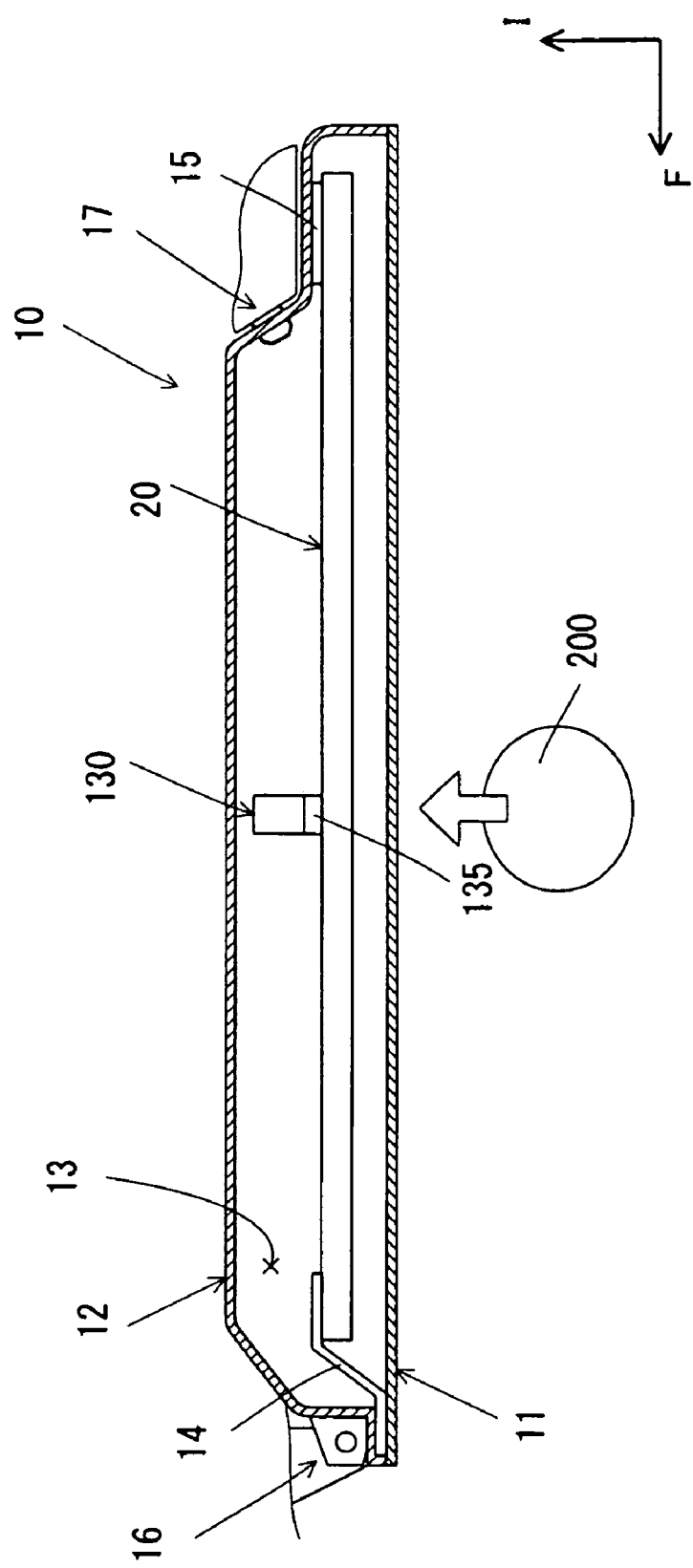
FIG. 4 is a schematic view showing the cross-sectional structure of the vehicle door just before an impactor crashes into the side of the vehicle door in the occupant restraint system according to an embodiment.
Figure 5:
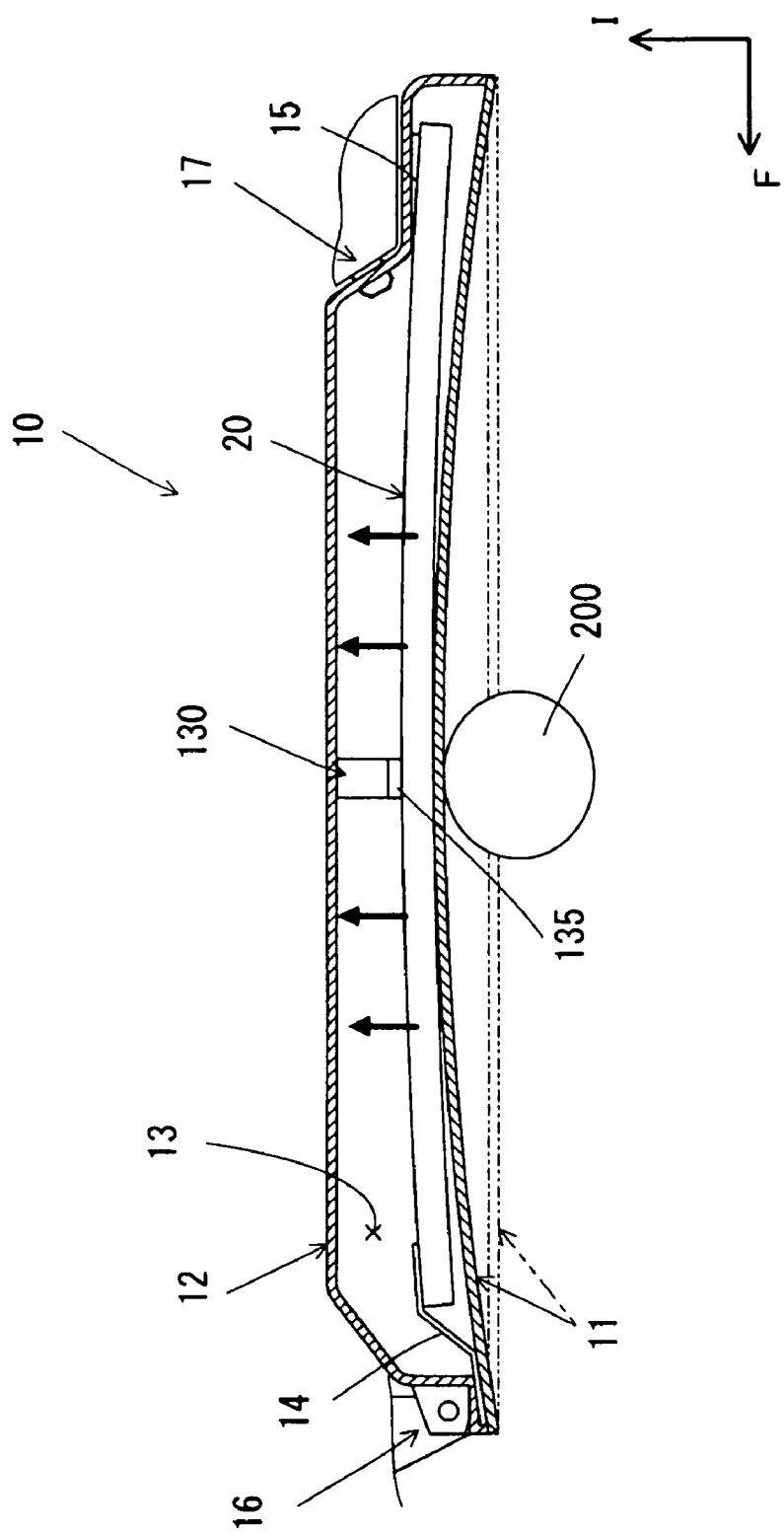
FIG. 5 is a schematic view showing the cross-sectional structure of the vehicle door when an impactor crashes into the side of the vehicle door in FIG. 4.
Figure 6:
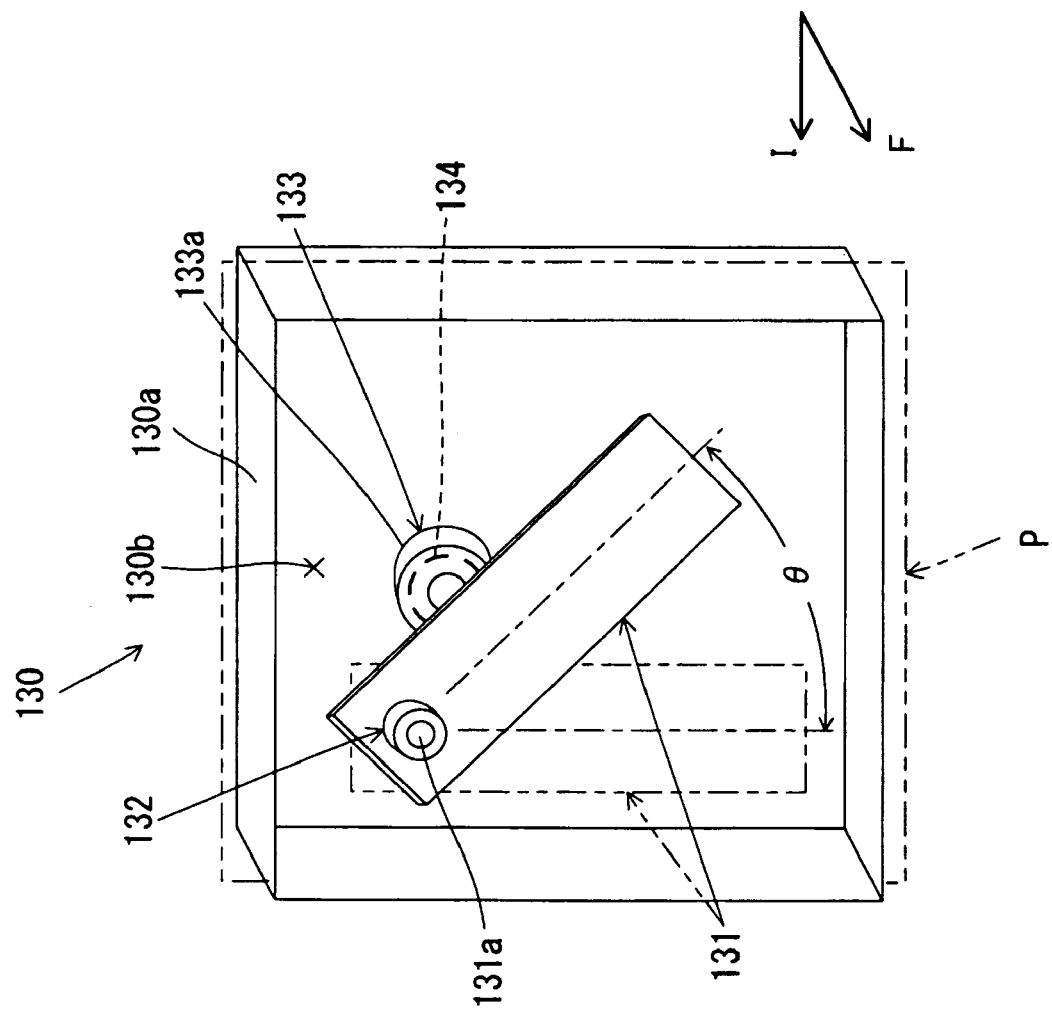
FIG. 6 is a schematic view showing the side impact crash sensor according to an embodiment of the present invention when it is triggered.

Referring now to FIGS. 4 to 6, the effects of the occupant restraint system 100 is shown according to an exemplary embodiment. FIG. 4 is a schematic view showing the cross-sectional structure of the vehicle door 10 just before an impactor 200 crashes into the side of the vehicle door 10 in the occupant restraint system 100 according to this embodiment. FIG. 5 is a schematic view showing the cross-sectional structure of the vehicle door 10 when the impactor 200 crashes into the side of the vehicle door 10 in FIG. 4. FIG. 6 is a schematic view showing the side impact crash sensor 130 according to this embodiment when it is triggered. In FIGS. 4-6, the impactor 200 may be, for example, a utility pole.

In FIGS. 4 to 6, an arrow F indicates the vehicle front (forward direction), and an arrow I indicates the inboard direction of the vehicle (direction of passenger compartment).

In a side impact, when a vehicle crashes at its side into an impactor 200, the door outer panel 11 of the vehicle door 10 is subjected to an impact from the side (from the lower part of FIG. 4) and deforms inward of the vehicle (to the upper part of FIG. 4). The impactor 200 collides with and intrudes on the door outer panel 11, causing it to collapse and moves to a position indicated by solid lines from, for example, a position indicated by dashed-two dotted lines as shown in FIG. 5. The door beam 20 is then deflected inward by the deformed outer door panel 11. At this time, the acceleration sensor 110 detects information on triaxial (X-axis, Y-axis, and Z-axis) acceleration acting on the vehicle at the time of a side crash into the impactor 200.

The side impact crash sensor 130 is triggered when an impact to the door outer panel 11 displaces the side impact crash sensor inward along with the door beam 20. Acceleration acting on the sensor housing 130a causes the rotating shaft 131a to move together with the sensor housing 130a, causing a load in an opposite direction to the acceleration to act on the pendulum 131 located at the initial position indicated by solid lines in FIG. 5.

At this time, when acceleration exceeding a prescribed level acts on the sensor housing 130a, inertia force exceeds an elastic urging force created by the spring 132, causing the pendulum 131 to rotate around the rotating shaft 131a from the initial position indicated by solid lines in FIG. 5 to, for example, a triggering position indicated by dashed-two dotted lines in FIG. 5. The rotating pendulum 131 shields part or all of the detecting section 133, which causes a change in impedance of the conductive coil 134. Such a change in impedance of the conductive coil 134 corresponds to the angle of rotation of the pendulum 131 (for example, angle of rotation $\ominus$ relative to the initial position indicated by solid lines in FIG. 6), thereby allowing the detecting section 133 to detect the angle of rotation and angular speed of the pendulum 131.

The detected angle of rotation and angular speed of the pendulum 131 are outputted as rotating operation information d of the pendulum 131 to the CPU 152 through the ASIC 154 of the ECU 150. The CPU 152 calculates the amount of movement and movement speed of the door beam 20 that moves as a unit together with the pendulum 131. When determining the rotation of the pendulum 131, the detecting section 133 may detect the angular acceleration of rotation and the amount of rotation, in addition to the angle of rotation and angular speed.

Figure 7:
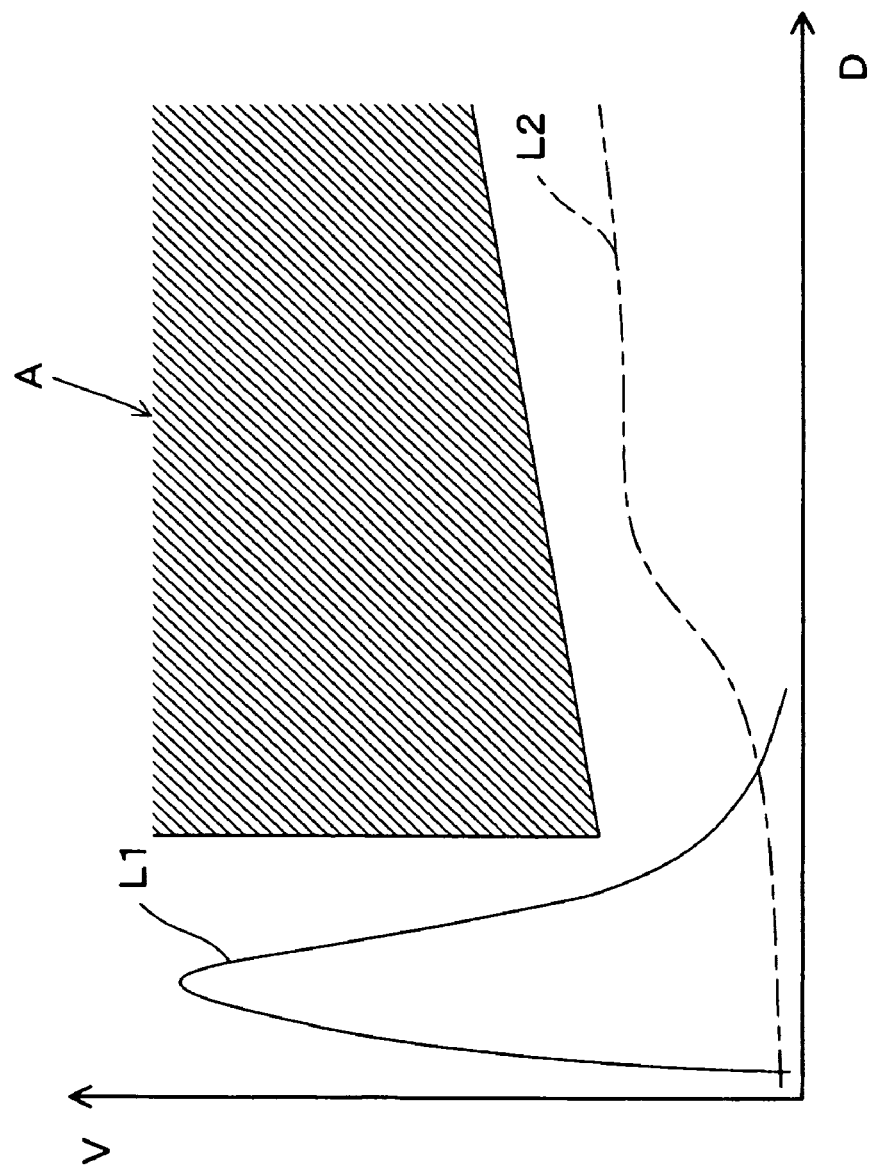
FIG. 7 is a schematic diagram showing a on-region for the side impact crash sensor according to an embodiment for the case in which a heavy object crashes into a side of a vehicle at high speeds.

The CPU 152 determines whether the calculated amount of movement and movement speed fall within a specified region to determine if a specified mode of a side impact crash has occurred. Reference is made to FIG. 7 for a specific example of such determination. In an example in FIG. 7, it is determined that specified mode of a side impact crash occurs when a heavy object crashes into a side of a vehicle at high speeds. Specifically, on the basis of the relationship between the movement speed V and the movement distance D, a region A in which both of the movement speed V and the movement distance D meet specified requirements is specified as the on-region for the side impact crash sensor 130, while a region other than the region A is specified as the off-region for the side impact crash sensor 130.

Several scenarios may cause an "on-region" impact (within the specified region A) according to the side impact crash sensor 130. For example, an object that is powerful enough to deform the door beam 20 may crash into a side of the door, which actually causes the door beam 20 to apparently deform as well as causes the vehicle door 10 to collapse. According to another example, an object that is deforming the vehicle door 10 may have a crash speed exceeding a certain value and such deformation is ongoing. According to still another example, a large, heavy object may deform the vehicle door 10 more than a prescribed level and such deformation is ongoing at speeds higher than a prescribed level.

In contrast, an "off-region" impact (outside the specified region A) for the side impact crash sensor 130 assumes that the movement speed V is relatively high and the movement distance D is relatively short, or more specifically, the vehicle door 10 deforms in a reversible fashion after colliding with, for example, a shopping cart, a ball, a bat, or the like other than on-the-street or roadside objects. The off-region includes a relationship L1 between a movement speed V and a movement distance D given when a light object crashes into a side of the door at high speeds or a relationship L2 between a movement speed V and a movement distance D given when a heavy object crashes into a side of the door at low speeds.

Meanwhile, the CPU 152 calculates the change in speed of the B pillar on the basis of the acceleration information a outputted from the acceleration sensor 110. Then, the CPU 152 determines whether the calculated change in speed of the B pillar exceeds a specified value for the acceleration sensor 110.

Finally, the CPU 152 (ECU 150) outputs an actuation signal (drive control signal e) to the airbag module 170 if it determines that the amount of movement and the movement speed calculated on the basis of the detected value from the side impact crash sensor 130 fall the specified region A for the side impact crash sensor 130 and the change in speed calculated on the basis of the detected value from the acceleration sensor 110 exceeds a specified value. This causes the gas supply unit of the airbag module 170 to release gas to inflate and deploy the airbag in the occupant restraint area. The airbag thus inflated and deployed mitigates an impact force acting on the lateral part of the occupant (head, neck, shoulder, thorax, abdomen, knee, and lower limb) as well as restrains the occupant.

As described above, the occupant restraint system 100 according to this embodiment allows a side impact crash mode of the vehicle door 10 to be properly determined using the side impact crash sensor 130 having a simplified structure. In other words, the side impact crash sensor 130 according to this embodiment eliminates the need for using an excessive number of complicated mechanisms and electronic components due to its structure mainly consisting of the pendulum 131 and the detecting section 133. Also, the side impact crash sensor 130 is a non-contact type sensor using the conductive coil 134 which is not easily affected by the ambient environment due to its high resistance to impact and unresponsiveness to impact. In addition, it is effective in improving the accuracy of the detecting section 133 to detect the rotation operation mode of the pendulum 131 due to its structure which causes the detecting section 133 to detect the pendulum 131 that rotates through a predetermined trajectory in the rotation plane P.

Furthermore, since the occupant restraint system 100 according to this embodiment determines the side impact crash mode of a vehicle on the basis of both the information detected by the side impact crash sensor 130 and the information detected by the acceleration sensor 110, it can make a proper determination as to whether an appropriate side impact crash is likely to need an immediate restraint of an occupant or it is so slight that it is unlikely to need or does not need an immediate restraint of the occupant, which is effective in further improving the accuracy of the determination of the side impact crash mode.

The pendulum 131 and the detecting section 133 are assembled to the sensor housing 130*a* in an integral manner, forming the side impact crash sensor 130 as a single sensor module. The same type of side impact crash sensor 130 can therefore be mounted as a unit to the door beam 20 with the mounting bracket 135 in vehicle doors of a variety of different vehicle models.

Since the door beam 20 extends over the wide range of the vehicle door 10 along the longitudinal direction of the vehicle, mounting the side impact crash sensor 130 to the door beam 20 allows a side impact crash to be detected in a stable manner over the wide range of the vehicle door 10. A side impact crash can be detected in a stable manner in a crash involving a wall, another vehicle, or another impactor 200 such as a utility pole as described above.

According to the foregoing embodiment, highly accurate information detected by the side impact crash sensor 130 is used to control the airbag module 170, thereby ensuring that a vehicle occupant is restrained.

The occupant restraint system 100 according to the foregoing embodiment provides a vehicle that uses highly accurate information detected by the side impact crash sensor 130 to control the airbag module 170 and other various types of vehicle related units to be subjected to control.

The foregoing embodiment is described in terms of the structure of an occupant restraint system mounted to an automobile. The present invention can also be applied to the structure of an occupant restraint system to be installed on various types of vehicles, including aircraft, ships and vessels, electric trains, buses, and trucks, in addition to automobiles.

It should be understood that the present invention is not limited to the aforementioned embodiment and various design changes could be made within the range of features disclosed in patent claims. Given the disclosure of the application, one versed in the art would appreciate that there may be other embodiments and modifications within the scope and spirit of the application. Accordingly, all modifications attainable by one versed in the art from the present disclosure within the scope and spirit of the present application are to be included as further embodiments of the present application.

For example, in the foregoing embodiment, both of the information detected by the acceleration sensor 110 and the information detected by the side impact crash sensor 130 are used to control the airbag module 170 that operates to restrain an occupant in the event of a side impact crash of a vehicle. Both of the information detected by the acceleration sensor 110 and the information detected by the side impact crash sensor 130 are also used to control an occupant restraint system such as a seatbelt apparatus or an alarm apparatus that provides a visual output and an audio output to inform an occupant of the occurrence of a side impact crash. Furthermore, the present invention may provide a structure that controls the airbag module 170 and other units to be subjected to control, on the basis of the information detected by at least the side impact crash sensor 130 or, for example, the information detected by only the side impact crash sensor 130.

The side impact crash sensor 130 according to the foregoing embodiment uses the spring 132 that provides an elastic urging force to the pendulum 131 so that the pendulum 131 rotates when acceleration exceeding a predetermined acceleration level acts on the sensor housing 130*a*. However, the present invention also may use a mechanism that prevents the pendulum 131 from rotating or allows the pendulum 131 to rotate according to the acceleration acting on the sensor housing 130*a*, in place of the spring 132.

The priority application, Japanese Patent Application No. 2008-255172, filed Sep. 30, 2008 including the specification, drawings, claims and abstract, is incorporated herein by reference in its entirety.

What is claimed is:

1. A side impact crash sensor that operates in conjunction with displacement of an outer panel of a vehicle door in the event of a side impact crash, the side impact crash sensor being disposed in a sectioned region bounded by the door outer panel and an door inner panel of the vehicle door, comprising:
    a sensor housing coupled to a vehicle door member in the sectioned region;
    a pendulum that is allowed to rotate around a rotating shaft secured to the sensor housing in the event of a side impact crash, the pendulum being conductive and being housed in a housing space of the sensor housing; and
    a detecting section for detecting a rotation operation mode of the pendulum on the basis of a change in impedance of a conductive coil which occurs in conjunction with a rotation operation of the pendulum, the detecting section having the conductive coil energized by an alternating current secured to the sensor housing so as to be opposed in the housing space to a plane in which the pendulum rotates.

2. The side impact crash sensor according to claim 1, wherein the pendulum has a spring for providing an elastic urging force to the pendulum so as to rotate the pendulum when acceleration exceeding a predetermined acceleration level acts on the sensor housing.

3. The side impact crash sensor according to claim 1, further comprising a modularized single sensor module having the pendulum and the detecting section integrally mounted to the sensor housing, the sensor module being mountable to the vehicle door member with a mounting bracket therebetween.

4. A side impact crash detection system for detecting information on a side impact crash of a vehicle, comprising:
   a side impact crash sensor according to that operates in conjunction with displacement of an outer panel of a vehicle door in the event of a side impact crash, the side impact crash sensor being disposed in a sectioned region bounded by the door outer panel and an door inner panel of the vehicle door, the sensor comprising:
      a sensor housing coupled to a vehicle door member in the sectioned region;
      a pendulum that is allowed to rotate around a rotating shaft secured to the sensor housing in the event of a side impact crash, the pendulum being conductive and being housed in a housing space of the sensor housing; and
      a detecting section for detecting a rotation operation mode of the pendulum on the basis of a change in impedance of a conductive coil which occurs in conjunction with a rotation operation of the pendulum, the detecting section having the conductive coil energized by an alternating current secured to the sensor housing so as to be opposed in the housing space to a plane in which the pendulum rotates; and
   a determination section for determining a side impact crash mode of the vehicle door,
   wherein the determination section determines the side impact crash mode of the vehicle door on the basis of the rotation operation mode of the pendulum detected by the detecting section of the side impact crash sensor.

5. The side impact crash detection system according to claim 4, wherein the pendulum has a spring for providing an elastic urging force to the pendulum so as to rotate the pendulum when acceleration exceeding a predetermined acceleration level acts on the sensor housing.

6. The side impact crash detection system according to claim 4, further comprising a modularized single sensor module having the pendulum and the detecting section integrally mounted to the sensor housing, the sensor module being mountable to the vehicle door member with a mounting bracket therebetween.

7. A vehicle, comprising:
   an engine operation system;
   an electrical system;
   a drive control unit that performs drive control of the engine operation system and the electrical system;
   a vehicle door whose door panel displaces in the event of a side impact crash of the vehicle, the vehicle door being provided for loading and unloading a vehicle occupant;
   a sensor apparatus that detects a side impact crash mode of the vehicle door; and
   a control signal output unit that outputs a control signal to an apparatus subjected to control on the basis of information detected by the sensor apparatus,
   wherein the sensor apparatus consists of the side impact crash detection system according to claim 4.

8. An occupant restraint system comprising:
   a side impact crash detection system for detecting information on a side impact crash of a vehicle, comprising:
      a side impact crash sensor according to that operates in conjunction with displacement of an outer panel of a vehicle door in the event of a side impact crash, the side impact crash sensor being disposed in a sectioned region bounded by the door outer panel and an door inner panel of the vehicle door, the sensor comprising:
         a sensor housing coupled to a vehicle door member in the sectioned region;
         a pendulum that is allowed to rotate around a rotating shaft secured to the sensor housing in the event of a side impact crash, the pendulum being conductive and being housed in a housing space of the sensor housing; and
         a detecting section for detecting a rotation operation mode of the pendulum on the basis of a change in impedance of a conductive coil which occurs in conjunction with a rotation operation of the pendulum, the detecting section having the conductive coil energized by an alternating current secured to the sensor housing so as to be opposed in the housing space to a plane in which the pendulum rotates; and
      a determination section for determining a side impact crash mode of the vehicle door,
      wherein the determination section determines the side impact crash mode of the vehicle door on the basis of the rotation operation mode of the pendulum detected by the detecting section of the side impact crash sensor; and
   an occupant restraint apparatus that restrains a vehicle occupant in the event of a side impact crash of a vehicle; and
   a control unit that performs drive control of the occupant restraint apparatus on the basis of information determined by the determination section of the side impact crash detection system.

9. The occupant restraint system according to claim 8, further comprising:
   an acceleration sensor that detects information on acceleration acting on the vehicle,
   wherein the control unit performs drive control of the occupant restraint apparatus on the basis of both the information determined by the determination section of the side impact crash detection system and information detected by the acceleration sensor.

* * * * *